(12) United States Patent
Woodley

(10) Patent No.: US 7,647,282 B1
(45) Date of Patent: Jan. 12, 2010

(54) SYSTEMS AND METHODS FOR REDUCING A RISK ASSOCIATED WITH THE SUPPLY OF A COMMODITY

(75) Inventor: John A. Woodley, Westport, CT (US)

(73) Assignee: Morgan Stanley, New York, NY (US)

( * ) Notice: Subject to any disclaimer, the term of this patent is extended or adjusted under 35 U.S.C. 154(b) by 0 days.

(21) Appl. No.: 11/713,564

(22) Filed: Mar. 2, 2007

Related U.S. Application Data

(63) Continuation of application No. 11/481,292, filed on Jul. 5, 2006, now abandoned.

(51) Int. Cl.
G06F 17/00 (2006.01)
G06Q 90/00 (2006.01)
G06Q 40/00 (2006.01)
G06Q 50/00 (2006.01)

(52) U.S. Cl. .......................... 705/412; 705/35; 705/37; 705/400

(58) Field of Classification Search .................. 705/1, 705/400, 412, 35, 37
See application file for complete search history.

(56) References Cited

U.S. PATENT DOCUMENTS

| | | | | |
|---|---|---|---|---|
| 7,200,572 | B2 * | 4/2007 | Beurskens | 705/37 |
| 2002/0052817 | A1 * | 5/2002 | Dines et al. | 705/36 |
| 2002/0138400 | A1 * | 9/2002 | Kitchen et al. | 705/37 |
| 2002/0156695 | A1 * | 10/2002 | Edwards | 705/26 |
| 2002/0178111 | A1 | 11/2002 | Woodley | |
| 2003/0163401 | A1 * | 8/2003 | Dines et al. | 705/35 |
| 2005/0222927 | A1 | 10/2005 | Woodley | |
| 2007/0094115 | A1 * | 4/2007 | Inman et al. | 705/35 |

OTHER PUBLICATIONS

Woodley, John A.C., "Reliabilitiy at any Cost—Risk Management through Contract Technology" (Proceedings of the 33rd Hawaii International Conference on System Sciences—2000).*
John A.C. Woodley, "Reliability at any Cost—Risk Management through Contract Technology," Proceedings of the 33$^{rd}$ Hawaii International Conference on System Sciences, 2000, 4 pages.
John A.C. Woodley, "Volatility, Capacity and Reliability," May 21, 2003, available at http://www.hks.harvard.edu/hepg/rlib_rp_reliability.html, 7 pages.

* cited by examiner

*Primary Examiner*—Igor N. Borissov
*Assistant Examiner*—Kevin Flynn
(74) *Attorney, Agent, or Firm*—K&L Gates LLP

(57) ABSTRACT

A method for reducing a risk associated with a commodity. The method is implemented at least in part by a computer and includes offering to supply the commodity to a commodity consumer. The offer includes an obligation to supply a first quantity of the commodity at a first price during a first period of time, an obligation to supply a second quantity of the commodity at a second price during a second period of time, and an obligation to supply a third quantity of the commodity at a third price during a third period of time. The second price is within a first price band defined by the first price, and the third price is within a second price band defined by the second price.

15 Claims, 2 Drawing Sheets

SYSTEMS AND METHODS FOR REDUCING A RISK ASSOCIATED WITH THE SUPPLY OF A COMMODITY

CROSS-REFERENCE TO RELATED APPLICATIONS

The present application is a continuation of U.S. patent application Ser. No. 11/481,292, filed Jul. 5, 2006 now abandoned.

BACKGROUND

This application discloses an invention that is related, generally and in various embodiments, to systems and methods for reducing a risk associated with a commodity supply contract.

A supplier of a commodity often enters into a long-term supply contract with a commodity consumer. In some supply contracts, the price of the commodity is fixed at a predetermined price for the entire term of the contract. In other supply contracts, there is a pricing schedule that stipulates a different predetermined price for each year of the contract (or some other applicable time period). Some consumers of the commodity prefer such arrangements because it allows them to budget their costs for the commodity for upcoming time periods (such as the upcoming fiscal year for the consumer). These arrangements, however, can be problematic if the market price of the commodity varies greatly from the predetermined price established by the supply contract. For example, if the market price increases substantially above the predetermined price, the supplier is exposed to a much greater risk. If the market price decreases substantially below the predetermined price, the consumer receives no benefit from the large drop in the market price.

To address such concerns, it is also known to include a predetermined price ceiling and/or a predetermined price floor in such contracts. The predetermined price ceiling may be fixed for the entire term of the contract, or may be different for each year of the contract. Similarly, the predetermined price floor may be fixed for the entire term of the contract, or may be different for each year of the contract. Both the price ceiling and the price floor serve to reduce the risks associated with variations between the market price of the commodity and the predetermined price established by the supply contract. However, because the price ceiling and the price floor are predetermined, they still fail to adequately protect the parties against risks resulting from events that have an extreme impact on the market prices of the commodity.

SUMMARY

In one general respect, this application discloses a method for reducing a risk associated with the supply of a commodity. According to various embodiments, the method is implemented at least in part by a computer and comprises offering to supply the commodity to a commodity consumer. The offer includes an obligation to supply a first quantity of the commodity at a first price during a first period of time, an obligation to supply a second quantity of the commodity at a second price during a second period of time, and an obligation to supply a third quantity of the commodity at a third price during a third period of time. The second price is within a first price band defined by the first price, and the third price is within a second price band defined by the second price.

In another general respect, this application discloses a system for reducing a risk associated with the supply of a commodity. According to various embodiments, the system includes a valuation module. The valuation module is configured for determining a benchmark price for the commodity for a period of time, determining a minimum contract price for the commodity for the period of time, determining a maximum contract price for the commodity for the period of time, and determining an actual contract price for the commodity for the period of time.

Aspects of the disclosed invention may be implemented by a computer system and/or by a computer program stored on a computer readable medium. The computer readable medium may comprise a disk and/or a device.

Other features and advantages will be apparent from the following description, including the drawings, and from the claims.

DESCRIPTION OF THE DRAWINGS

Various embodiments of the present invention are described herein by way of example in conjunction with the following figures, wherein.

DETAILED DESCRIPTION

The figures and descriptions of the disclosed invention have been simplified to illustrate elements that are relevant for a clear understanding of the disclosed invention. It should be understood that the methods and systems described below may include various other processes, components, and elements in actual implementation.

Figure 1:
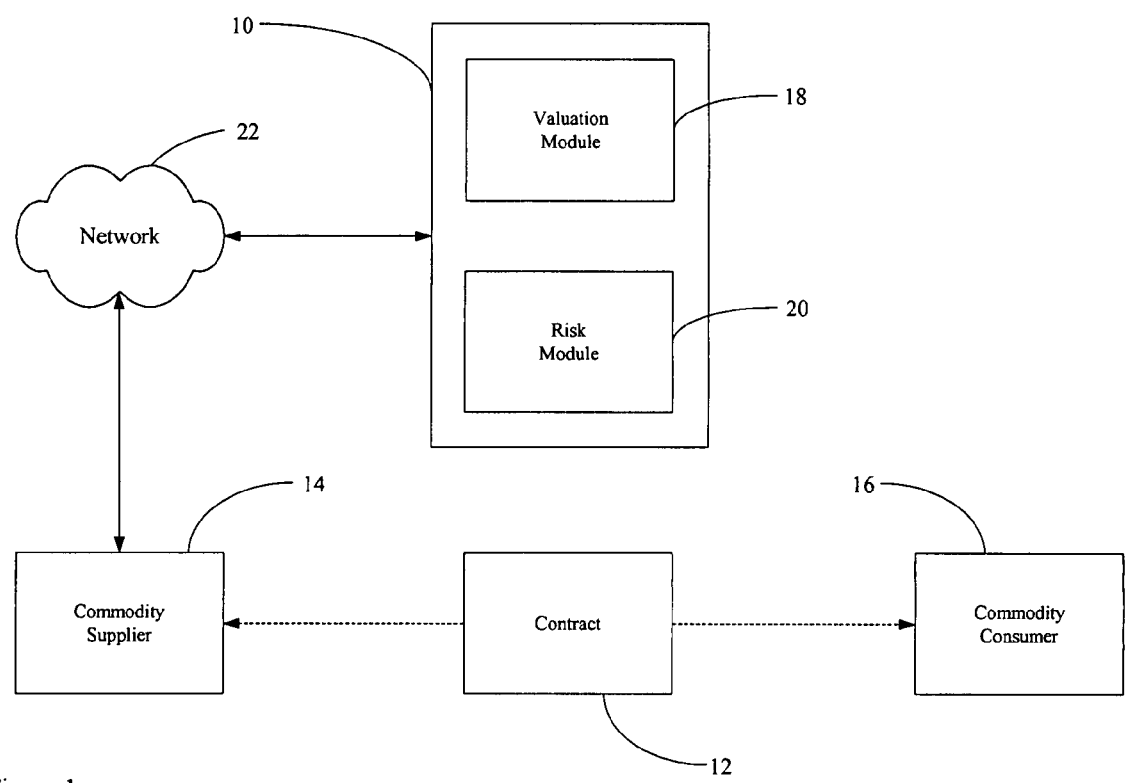
FIG. 1 illustrates various embodiments of a system for reducing risk associated with a commodity.

FIG. 1 illustrates various embodiments of a system 10 for reducing a risk associated with the supply of a commodity. The commodity may be associated with transactions executed in accordance with a contract 12 between a commodity supplier 14 and a commodity consumer 16. The relationship between the contract 12, the commodity supplier 14 and the commodity consumer 16 is represented as dashed lines in FIG. 1. The commodity may be any type of commodity (e.g., electricity, oil, natural gas, water, wheat, coffee, etc.). However, for purposes of simplicity only, it is assumed that the commodity is electricity in the following description. The commodity supplier 14 may be any type of entity and the commodity consumer 16 may be any type of entity. The commodity supplier 14 and the commodity consumer 16 may utilize various hardware, software, and/or storage mediums (not shown) for communicating with one another.

The contract 12 may be for any length of time (e.g., five years, seven years, etc.), may be embodied as one or more paper and/or electronic documents, and may contain any number of rights and obligations in the context of the transactions. For example, the contract 12 may obligate the commodity supplier 14 to supply various quantities of the commodity to the commodity consumer 16 at various prices during various periods of time throughout the term of the contract 12.

According to various embodiments, the contract 12 may obligate the commodity supplier 14 to supply a first quantity of the commodity to the commodity consumer 16 at a first price during a first period of time. The first quantity may be a fixed quantity or a variable quantity, and the variable quantity may be limited to a predetermined range. The first period of time may be any period of time (e.g., a day, a month, a year, etc.). The first price may be a predetermined fixed price corresponding to an actual forward (OTC) price of the commodity near the start of the first period of time.

The contract 12 may also obligate the commodity supplier 14 to supply a second quantity of the commodity to the commodity consumer 16 at a second price during a second period of time. The second quantity may be a fixed quantity or a variable quantity, and the variable quantity may be limited to a predetermined range. The second quantity may be the same as or different than the first quantity, and the predetermined range associated with the second quantity may be the same as or different than the predetermined range associated with the first quantity. The second period of time may be any period of time (e.g., a day, a month, a year, etc.). The second price is within a first price band defined by the first price, and may be more than, less than, or equal to the first price. The first price band includes a first minimum price (i.e., a price floor) that is set to be some amount below the first price and a first maximum price (i.e., a price ceiling) that is set to be some amount above the first price. For example, the first minimum price may be set to be 95% of the first price and the first maximum price may be set to be 105% of the first price. The difference between the first price and the first minimum price may be more than, less than, or equal to the difference between the first maximum price and the first price.

Depending on the market prices of the commodity near the start of the second period of time, the second price may be the first minimum price, the first maximum price, or a price therebetween that is a product of the first price, a first benchmark price ratio, and a first inflation factor. The first inflation factor may be any value greater than zero (e.g., 0.98, 1.02, etc.). The first benchmark price ratio is determined by dividing a benchmark price for the commodity for the second period of time by a benchmark price for the commodity for the first period of time. The benchmark price for the commodity for the first period of time may be set to the first price. The benchmark price for the commodity for the second period of time may be set to a value determined by the following equation:

$$AP = \frac{a \times P_{peak} + b \times P_{base} + c \times C}{a + b + c}$$

where "AP" is the benchmark price, "$P_{peak}$" is a load-weighted price for annual on-peak energy, "a" is a consumption factor associated with $P_{peak}$, "$P_{base}$" is a load-weighted price for annual baseload energy, "b" is a consumption factor associated with $P_{peak}$, "C" is a load-weighted converted coal price, and "c" is a consumption factor associated with C. The respective values for $P_{peak}$ and $P_{base}$ may be load-weighted averages of third-party, arms-length quotes received or actual transactions conducted with creditworthy counterparties near to the start of the second period of time. The value for C may be determined by dividing a value of an API2 coal index near to the start of the second period of time by a product of a virtual power plant efficiency factor (e.g., 39.5%) and a coal conversion factor (e.g., 6.985 Mwh/T). For currency sensitive transactions, the value determined by the equation for the benchmark price for the second period of time may be modified by multiplying the value by an appropriate exchange rate.

The contract 12 may also obligate the commodity supplier 14 to supply a third quantity of the commodity to the commodity consumer 16 at a third price during a third period of time. The third quantity may be a fixed quantity or a variable quantity, and the variable quantity may be limited to a predetermined range. The third quantity may be the same as or different than the second quantity, and the predetermined range associated with the third quantity may be the same as or different than the predetermined range associated with the second quantity. The third period of time may be any period of time (e.g., a day, a month, a year, etc.). The third price is within a second price band defined by the second price, and may be more than, less than, or equal to the second price. The second price band includes a second minimum price (i.e., a price floor) that is set to be some amount below the second price and a second maximum price (i.e., a price ceiling) that is set to be some amount above the second price. For example, the second minimum price may be set to be 95% of the second price and the second maximum price may be set to be 105% of the second price. The difference between the second price and the second minimum price may be more than, less than, or equal to the difference between the second maximum price and the second price.

Depending on the market prices of the commodity near the start of the third period of time, the third price may be the second minimum price, the second maximum price, or a price therebetween that is a product of the second price, a second benchmark price ratio, and a second inflation factor. The second inflation factor may be any value greater than zero, and may be more than, less than, or equal to the first inflation factor. The second benchmark price ratio is determined by dividing a benchmark price for the commodity for the third period of time by the benchmark price for the commodity for the second period of time. The benchmark price for the commodity for the third period of time may be determined by the same equation used to determine the benchmark price for the second period of time using values determined near the start of the third period. For currency sensitive transactions, the value determined by the equation for the benchmark price for the third period of time may be modified by multiplying the value by an appropriate exchange rate.

Depending on the length of the contract 12, the commodity supplier 14 may be further obligated to supply a fourth (fifth, sixth, etc.) quantity of the commodity at a fourth (fifth, sixth, etc.) price during a fourth (fifth, sixth, etc.) period of time, where the price for each year is within a price band defined by the price from the previous year. Thus, the respective minimum and maximum prices associated with each price band price are not predetermined, and the respective prices of the commodity for each period of time are not predetermined. Rather, the respective minimum and maximum prices associated with each price band price and the respective prices of the commodity for each period of time can vary from year to year in accordance with changes in market prices. Such a structure provides some hedging against market volatility while protecting the commodity supplier 14 and the commodity consumer 16 against risks resulting from events that have an extreme impact on the market prices of the commodity.

As shown in FIG. 1, the system 10 includes a valuation module 18. The valuation module 18 is configured for determining the respective prices to be charged by the commodity supplier 14 to the commodity consumer 16 during each period of the contract 12. For example, the valuation module 18 may be configured for determining the benchmark price for the commodity for a period of time, determining a minimum contract price for the commodity for the period of time, determining a maximum contract price for the commodity for the period of time, and determining an actual contract price for the commodity for the period of time.

According to various embodiments, the system 10 also includes a risk module 20 configured for determining a risk position associated with the offer to supply the commodity. The risk module 20 may, for example, utilize the prices determined by the valuation module 18 to determine the risk position for the commodity supplier 14 on a daily basis. Armed with this information, the commodity supplier 14 may elect to hedge its risk associated with the contract 12 by executing other transactions.

The modules 18, 20 may be implemented utilizing any suitable computer language (e.g., C, C++, Java, JavaScript, Visual Basic, VBScript, Delphi) and may be embodied permanently or temporarily in any type of machine, component, physical or virtual equipment, or storage medium, capable of delivering instructions to a device. The modules 18, 20 (e.g., software application, computer program) may be stored on a computer-readable medium (e.g., disk and/or device) such that when a computer reads the medium, the functions described herein are performed. According to various embodiments, the functionality of the modules 18, 20 may be implemented by a single module.

As shown in FIG. 1, the commodity supplier 14 may be in communication with the system 10 via a network 22 having wired or wireless data pathways. The network 22 may include any type of delivery system including, but not limited to, a local area network (e.g., Ethernet), a wide area network (e.g. the Internet and/or World Wide Web), a telephone network (e.g., analog, digital, wired, wireless, PSTN, ISDN, GSM, GPRS, and/or xDSL), a packet-switched network, a radio network, a television network, a cable network, a satellite network, and/or any other wired or wireless communications network configured to carry data. The network 22 may include elements, such as, for example, intermediate nodes, proxy servers, routers, switches, and adapters configured to direct and/or deliver data.

In general, the system 10 may be structured and arranged to communicate with the commodity supplier 14 via the network 22 using various communication protocols (e.g., HTTP, TCP/IP, UDP, WAP, WiFi, Bluetooth) and/or to operate within or in concert with one or more other communications systems.

Figure 2:
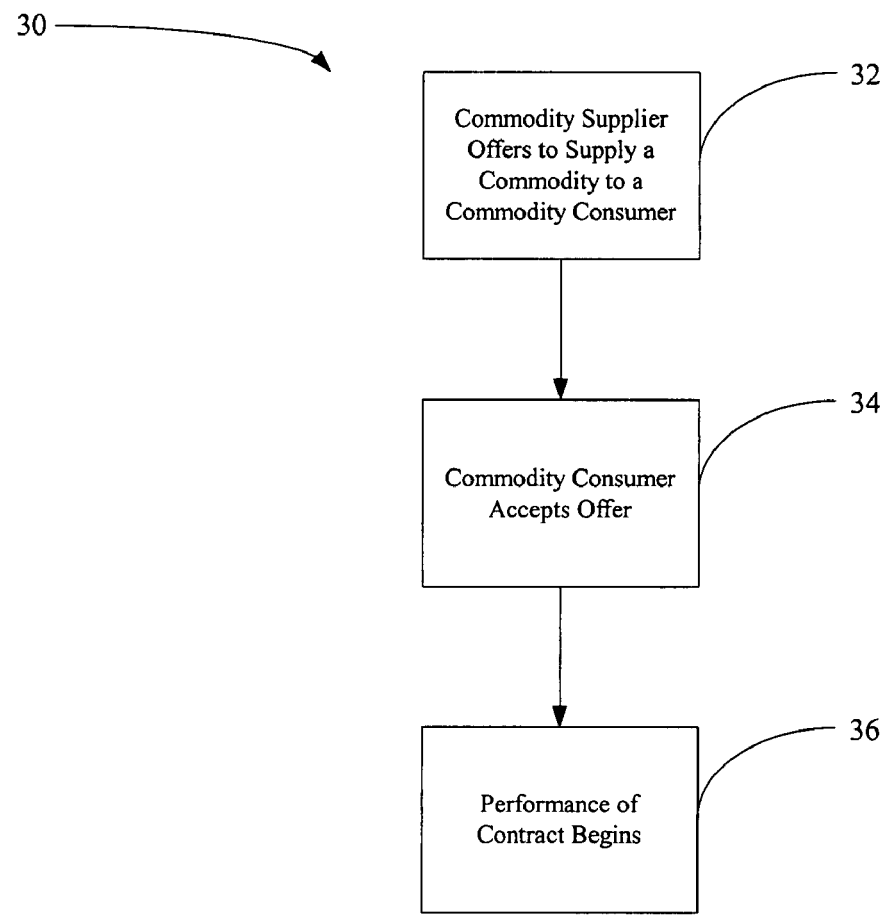
FIG. 2 illustrates various embodiments of a method for reducing risk associated with a commodity.

FIG. 2 illustrates various embodiments of a method 30 for reducing a risk associated with a commodity. In various implementations, the method 30 may be implemented at least in part by hardware (e.g., device, computer, computer system, equipment, component); software (e.g., program, application, instruction set, code); storage medium (e.g., disk, device); or combination thereof. It should be noted, however, that the method 30 may be performed in any manner consistent with aspects of the disclosed invention. The hardware and software may be used to generate printed materials such as, for example, the contract 12 associated with the commodity.

At step 32, a commodity supplier 14 offers to supply a commodity to a commodity consumer 16. The offer may obligate the commodity supplier 14 to supply a first quantity of the commodity at a first price during a first period of time, a second quantity of the commodity at a second price during a second period of time, and a third quantity of the commodity at a third price during a third period of time. The second price is within a first price band defined by the first price, and the third price is within a second price band defined by the second price. The offer may further obligate the commodity supplier 14 to supply additional quantities of the commodity at various prices during additional periods of time as described hereinabove.

At step 34, the commodity consumer 16 accepts the commodity supplier's offer, and then the contract 12 becomes effective.

At step 36, the performance of the contract 12 begins, and the commodity supplier 14 starts to supply the commodity to the commodity consumer 16 in accordance with the terms of the contract 12. As disclosed hereinabove, several periods of time (e.g., several years) may be required to complete the performance of the contract 12.

The benefits of the disclosed methods, systems and computer-readable media are readily apparent to those skilled in the art. The term "computer-readable medium" as used herein may include, for example, magnetic and optical memory devices such as diskettes, compact discs of both read-only and writeable varieties, optical disk drives, and hard disk drives.

A computer-readable medium may also include memory storage that can be physical, virtual, permanent, temporary, semi-permanent and/or semi-temporary. The various portions and components of various embodiments of the disclosed invention can be implemented in computer software code using, for example, Visual Basic, C, or C++ computer languages using, for example, object-oriented techniques.

While several embodiments of the invention have been described, it should be apparent, however, that various modifications, alterations and adaptations to those embodiments may occur to persons skilled in the art with the attainment of some or all of the advantages of the disclosed invention. For example, the commodity supplier's offer to supply the commodity to the commodity consumer 16 may provide the commodity consumer 16 the right to lock in a price for the commodity at any time during the year prior to delivery of the commodity. Therefore, this application is intended to cover all such modifications, alterations and adaptations without departing from the scope and spirit of the disclosed invention as defined by the appended claims.

What is claimed is:

1. A method, implemented at least in part by a computer, for reducing a risk associated with a commodity, the method comprising:

offering to supply the commodity to a commodity consumer, wherein the offer includes:
an obligation to supply a first quantity of the commodity at a first price ($P_1$) during a first period of time;
an obligation to supply a second quantity of the commodity at a second price ($P_2$) during a second period of time, wherein the second price ($P_2$) is within a first price band defined by a first price band minimum price and a first price band maximum price, wherein the first price band minimum price is based on a first scale factor ($\alpha_1$) times the first price ($P_1$) and the first price band maximum price is based on a second scale factor ($\alpha_2$) times the first price ($P_1$), where $\alpha_1 < 1 < \alpha_2$;
an obligation to supply a third quantity of the commodity at a third price ($P_3$) during a third period of time, wherein the third price ($P_3$) is within a second price band defined by a second price band minimum price and a second price band maximum price, wherein the second price band minimum price is based on a third scale factor ($\alpha_3$) times the second price ($P_2$) and the second price band maximum price is based on a fourth scale factor ($\alpha_4$) times the second price ($P_2$), where $\alpha_3 < 1 < \alpha_4$; and
determining, by a computer that executes instructions stored on a computer readable memory device, the second price ($P_2$) based on the first price band and a market price for the commodity at the start of the second period, wherein the second price $P_2$ is set to a price based on a product of the first price ($P_1$), a first benchmark price ratio, and a first inflation factor when the product of the first price ($P_1$), the first benchmark price ratio, and the first inflation factor is greater than the first price band minimum price and less than the first price band maximum price, wherein the first benchmark price ratio is based on a ratio of a benchmark price for the commodity for the second time period to a benchmark price for the commodity for the first time period.

2. The method of claim 1, wherein at least one of the first, second and third quantities is a fixed quantity.

3. The method of claim 1, wherein at least one of the first, second and third quantities is a variable quantity.

4. The method of claim 3, wherein the variable quantity is within a predetermined range.

5. The method of claim 1, wherein the commodity is electricity.

6. The method of claim 1, wherein at least one of the first, second and third periods of time corresponds to a calendar year.

7. The method of claim 1, wherein the first price ($P_1$) is a predetermined price.

8. The method of claim 1, wherein the benchmark price (AP) for the first and second periods of time is determined by the equation $$AP = \frac{a \times P_{peak} + b \times P_{base} + c \times C}{a + b + c}$$

where
"$P_{peak}$" is a load-weighted price for annual on-peak energy;
"a" is a consumption factor associated with $P_{peak}$;
"$P_{base}$" is a load-weighted price for annual baseload energy;
"b" is a consumption factor associated with $P_{peak}$;
"C" is a load-weighted converted coal price; and
"c" is a consumption factor associated with C.

9. The method of claim 8, wherein the load weighted converted coal price is determined by dividing an API2 coal index by a product of a virtual power plant efficiency and a coal conversion factor.

10. A system for determining a price of a commodity subject to a contract, wherein the contract obligates a supplier to supply a first quantity of the commodity at a first price ($P_1$) during a first period of time and to supply a second quantity of the commodity during a second period of time, the system comprising:
a computer comprising a computer readable memory device and a processor, wherein the memory device comprises instructions that when executed by the processor, causes the processor to determine a second price $P_2$ for the commodity for the second period of time by:
determining a first price band minimum price for the commodity for the second period of time based upon the first price ($P_1$), wherein the first price band minimum price is based on a first scale factor ($\alpha_1$) times the first price ($P_1$);
determining a first price band maximum price for the commodity for the second period of time based upon the first price ($P_1$), wherein the first price band maximum price is based on a second scale factor ($\alpha_2$) times the first price ($P_1$), where $\alpha_2<1<\alpha2$; and
determining the second price ($P_2$) for the commodity for the second period of time, wherein the second price ($P_2$) is within a first price band defined by the first price band minimum price and the first price band maximum price, wherein the second price $P_2$ is determined to be a price based on a product of the first price ($P_1$), a first benchmark price ratio, and a first inflation factor when the product of the first price ($P_1$), the first benchmark price ratio, and the first inflation factor is greater than the first price band minimum price and less than the first price band maximum price, wherein the first benchmark price ratio is based on a ratio of a benchmark price for the commodity for the second time period to a benchmark price for the commodity for the first time period.

11. The system of claim 10, wherein the memory device comprises instructions that when executed by the computer, causes the computer to:
determine a risk position associated with an offer to supply the commodity.

12. A computer program stored on a computer-readable medium, the program comprising instructions that when executed by a computer cause the computer to determine a price of a commodity subject to a contract, wherein the contract obligates a supplier to supply a first quantity of the commodity at a first price ($P_1$) during a first period of time and to supply a second quantity of the commodity during a second period of time by:
determining a first price band minimum price for the commodity for the second period of time based upon the first price ($P_1$), wherein the first price band minimum price is based on a first scale factor ($\alpha_1$) times the first price ($P_1$);
determining a first price band maximum price for the commodity for the second period of time based upon the first price ($P_1$), wherein the first price band maximum contract price is based on a second scale factor ($\alpha_2$) times the first price ($P_1$), where $\alpha_1<1<\alpha2$; and
determining a second price ($P_2$) for the commodity for the second period of time, wherein the second price ($P_2$) is within a first price band defined by the first price band minimum price and the first price band maximum contract price, wherein the second price $P_2$ is determined to be a price that is based on a product of the first price ($P_1$), a first benchmark price ratio, and a first inflation factor when the product of the first price ($P_1$), the first benchmark price ratio, and the first inflation factor is greater than the first price band minimum price and less than the first price band maximum price, wherein the first benchmark price ratio is based on a ratio of a benchmark price for the commodity for the second time period to a benchmark price for the commodity for the first time period.

13. The program of claim 12, wherein the program further comprises instructions for determining a risk position associated with an offer to supply the commodity.

14. The method of claim 1, wherein the computer is connected to a data communications network that comprises a LAN.

15. The method of claim 1, wherein the computer is connected to a data communications network that comprises a WAN.

* * * * *